(12) United States Patent
Lumezanu et al.

(10) Patent No.: US 11,355,138 B2
(45) Date of Patent: *Jun. 7, 2022

(54) AUDIO SCENE RECOGNITION USING TIME SERIES ANALYSIS

(71) Applicant: NEC Laboratories America, Inc., Princeton, NJ (US)

(72) Inventors: Cristian Lumezanu, Princeton Junction, NJ (US); Yuncong Chen, Plainsboro, NJ (US); Dongjin Song, Princeton, NJ (US); Takehiko Mizuguchi, Princeton, NJ (US); Haifeng Chen, West Windsor, NJ (US); Bo Dong, Richardson, TX (US)

(73) Assignee: NEC Corporation

( * ) Notice: Subject to any disclaimer, the term of this patent is extended or adjusted under 35 U.S.C. 154(b) by 1 day.

This patent is subject to a terminal disclaimer.

(21) Appl. No.: 16/997,249

(22) Filed: Aug. 19, 2020

(65) Prior Publication Data

US 2021/0065734 A1 Mar. 4, 2021

Related U.S. Application Data

(60) Provisional application No. 62/915,668, filed on Oct. 16, 2019, provisional application No. 62/892,057, (Continued)

(51) Int. Cl.
*G10L 25/51* (2013.01)
*G10L 25/24* (2013.01)
(Continued)

(52) U.S. Cl.
CPC .............. *G10L 25/51* (2013.01); *G10L 25/24* (2013.01); *G10L 25/18* (2013.01); *G10L 25/21* (2013.01)

(58) Field of Classification Search
CPC ......... G10L 25/51; G10L 25/24; G10L 25/18; G10L 25/21; G10L 2015/081; G10L 15/08; G10L 15/083
(Continued)

(56) References Cited

U.S. PATENT DOCUMENTS 10,210,860 B1 * 2/2019 Ward .................... G10L 15/30
10,930,301 B1 * 2/2021 Lumezanu ........... G06N 3/0445
(Continued)

OTHER PUBLICATIONS

Aziz et al., "Automatic Scene Recognition through Acoustic Classification for Behavioral Robotics", Electronics 2019, Apr. 2019, pp. 1-17.
(Continued)

*Primary Examiner* — David L Ton
(74) *Attorney, Agent, or Firm* — Joseph Kolodka

(57) ABSTRACT

A method is provided. Intermediate audio features are generated from respective segments of an input acoustic time series for a same scene. Using a nearest neighbor search, respective segments of the input acoustic time series are classified based on the intermediate audio features to generate a final intermediate feature as a classification for the input acoustic time series. Each respective segment corresponds to a respective different acoustic window. The generating step includes learning the intermediate audio features from Multi-Frequency Cepstral Component (MFCC) features extracted from the input acoustic time series, dividing the same scene into the different windows having varying MFCC features, and feeding the MFCC features of each window into respective LSTM units such that a hidden state of each respective LSTM unit is passed through an attention layer to identify feature correlations between hidden states at different time steps corresponding to different ones of the different windows.

20 Claims, 12 Drawing Sheets

Related U.S. Application Data filed on Aug. 27, 2019, provisional application No. 62/892,022, filed on Aug. 27, 2019.

(51) Int. Cl.
   *G10L 25/18* (2013.01)
   *G10L 25/21* (2013.01)

(58) Field of Classification Search
   USPC .......................................................... 381/56
   See application file for complete search history.

(56) References Cited

U.S. PATENT DOCUMENTS

| | | | |
|---|---|---|---|
| 2017/0103752 A1* | 4/2017 | Senior | G06N 3/0445 |
| 2017/0270919 A1* | 9/2017 | Parthasarathi | G10L 15/02 |
| 2017/0372725 A1* | 12/2017 | Khoury | G10L 25/45 |
| 2018/0174576 A1* | 6/2018 | Soltau | G06N 3/084 |
| 2019/0035390 A1* | 1/2019 | Howard | G10L 15/16 |
| 2019/0042881 A1* | 2/2019 | Lopatka | G06N 3/08 |
| 2020/0046244 A1* | 2/2020 | Alam | G06N 3/0454 |
| 2020/0104319 A1* | 4/2020 | Jati | G06N 3/084 |

OTHER PUBLICATIONS

Bahdanau et al., "Neural Machine Translation by Jointly Learning to Align and Translate", arXiv:1409.0473v7 [cs.CL] May 2016, pp. 1-15.

Cano et al., "A Review of Audio Fingerprinting", Journal of VLSI Signal Processing 41, Aug. 2005, pp. 271-284.

Chen et al., "Class-aware Self-Attention for Audio Event Recognition", ICMR'18, Jun. 2018, pp. 28-36.

Cho et al., "Learning Phrase Representations using RNN Encoder-Decoder for Statistical Machine Translation", arXiv:1406.1078v3[cs.CL] Sep. 2014, 15 pages.

Dai, "Acoustic Scene Recognition with Deep Learning", Semantic Scholar, Jun. 2016, pp. 1-18.

Guo et al., "Attention based CLDNNs for Short-Duration Acoustic Scene Classification", ResearchGate, Aug. 2017, 5 pages.

Phan et al., "Spatio-Temporal Attention Pooling for Audio Scene Classification", INTERSPEECH 2019, Sep. 2019, pp. 3845-3849.

Istrate et al., "Information Extraction From Sound for Medical Telemonitoring", IEEE Transactions on Information Technology in Biomedicine, Apr. 2006, vol. 10, No. 2, pp. 264-274.

Jansen et al., "Unsupervised Learning of Semantic Audio Representations", http://arxiv.org/abs/1711.02209v1, Nov. 2017, 5 pages.

Ono et al., "Separation of a Monaural Audio Signal Into Harmonic/Percussive Components by Complementary Diffusion on Spectrogram", ResearchGate, Jan. 2008, 5 pages.

Phan et al., "Audio Scene Classification with Deep Recurrent Neural Networks", arXiv:1703.04770v2 [cs.SD] Jun. 2017, 5 pages.

Pour et al., "Gammatonegram Based Speaker Identification", 2014 4th International Conference on Computer Knowledge Engineering (ICCKE), Oct. 2014, pp. 52-55.

Schroff et al., "FaceNet: A Unified Embedding for Face Recognition and Clustering", arXiv:1503.03832v3 [cs.CV] Jun. 17, 2015, pp. 1-10.

Sutskever et al., "Sequence to Sequence Learning with Neural Networks", http://arxiv.org/abs/1409.3215v3, Dec. 2014, pp. 1-9.

Turpault et al., "Semi-Supervised Triplet Loss Based Learning of Ambient Audio Embeddings", ICASSP 2019, May 2019, pp. 760-764.

Vaswani et al., "Attention Is All You Need", arXiv:1706.03762v5 [cs.CL] Dec. 2017, pp. 1-15.

\* cited by examiner

AUDIO SCENE RECOGNITION USING TIME SERIES ANALYSIS

RELATED APPLICATION INFORMATION

This application claims priority to U.S. Provisional Patent Application No. 62/892,057, filed on Aug. 27, 2019, U.S. Provisional Patent Application No. 62/892,022, filed on Aug. 27, 2019 and U.S. Provisional Patent Application No. 62/915,668, filed on Oct. 16, 2019, incorporated herein by reference in their respective entireties.

BACKGROUND

Technical Field

The present invention relates to scene recognition and more particularly to audio scene recognition using time series analysis.

Description of the Related Art

Audio (or acoustic) scene analysis is the task of identifying the category (or categories) of a surrounding environment using acoustic signals. The task of audio scene analysis can be framed in two ways: (1) scene recognition, where the goal is to associate a single category with an entire scene (e.g., park, restaurant, train, etc.), and (2) event detection, where the goal is to detect shorter sound events in an audio scene (e.g., door knock, laughter, keyboard click, etc.). Audio scene analysis has several important applications, several of which include, for example: multimedia retrieval (automatic tagging of sports or music scenes); intelligent monitoring systems (identify specific sounds in the environment); acoustic surveillance; search in audio archives; cataloging and indexing. An important step in audio scene analysis is the processing of the raw audio data with the goal of computing representative audio features that can be used to identify the correct categories (also known as the feature selection process).

SUMMARY

According to aspects of the present invention, a computer-implemented method for audio scene classification in an information retrieval system is provided. The method includes generating intermediate audio features from respective segments of an input acoustic time series for a same scene captured by a sensor device. The method further includes classifying, using a nearest neighbor search, the respective segments of the input acoustic time series based on the intermediate audio features to generate a final intermediate feature as a classification for the input acoustic time series. Each of the respective segments correspond to a respective different one of different acoustic windows. The generating step includes learning the intermediate audio features from Multi-Frequency Cepstral Component (MFCC) features extracted from the input acoustic time series. The generating step further includes dividing the same scene into the different acoustic windows having varying ones of the MFCC features. The generating step also includes feeding the MFCC features of each of the different acoustic windows into respective LSTM units such that a hidden state of each of the respective LSTM units is passed through an attention layer to identify feature correlations between hidden states at different time steps corresponding to different ones of the different acoustic windows. The method further includes replacing a hardware device monitored by the sensor responsive to the final intermediate feature.

According to other aspects of the present invention, a computer program product for audio scene classification in an information retrieval system is provided. The computer program product includes a non-transitory computer readable storage medium having program instructions embodied therewith. The program instructions are executable by a computer to cause the computer to perform a method. The method includes generating intermediate audio features from respective segments of an input acoustic time series for a same scene captured by a sensor device. The method further includes classifying, using a nearest neighbor search, the respective segments of the input acoustic time series based on the intermediate audio features to generate a final intermediate feature as a classification for the input acoustic time series. Each of the respective segments corresponding to a respective different one of different acoustic windows. The generating step includes learning the intermediate audio features from Multi-Frequency Cepstral Component (MFCC) features extracted from the input acoustic time series. The generating step further includes dividing the same scene into the different acoustic windows having varying ones of the MFCC features. The generating step also includes feeding the MFCC features of each of the different acoustic windows into respective LSTM units such that a hidden state of each of the respective LSTM units is passed through an attention layer to identify feature correlations between hidden states at different time steps corresponding to different ones of the different acoustic windows. The method further includes replacing a hardware device monitored by the sensor responsive to the final intermediate feature.

According to yet other aspects of the present invention, a computer processing system for audio scene classification in an information retrieval system is provided. The system includes a memory device for storing program code. The system further includes a hardware processor, operatively coupled to the memory device, for running the program code to generate intermediate audio features from respective segments of an input acoustic time series for a same scene captured by a sensor device. The hardware processor further runs the program code to classify, using a nearest neighbor search, the respective segments of the input acoustic time series based on the intermediate audio features to generate a final intermediate feature as a classification for the input acoustic time series. Each of the respective segments correspond to a respective different one of different acoustic windows. The hardware processor runs the program code to generate the intermediate audio features to learn the intermediate audio features from Multi-Frequency Cepstral Component (MFCC) features extracted from the input acoustic time series, divide the same scene into the different acoustic windows having varying ones of the MFCC features, and feed the MFCC features of each of the different acoustic windows into respective LSTM units such that a hidden state of each of the respective LSTM units is passed through an attention layer to identify feature correlations between hidden states at different time steps corresponding to different ones of the different acoustic windows. The hardware processor replaces a hardware device monitored by the sensor responsive to the final intermediate feature.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
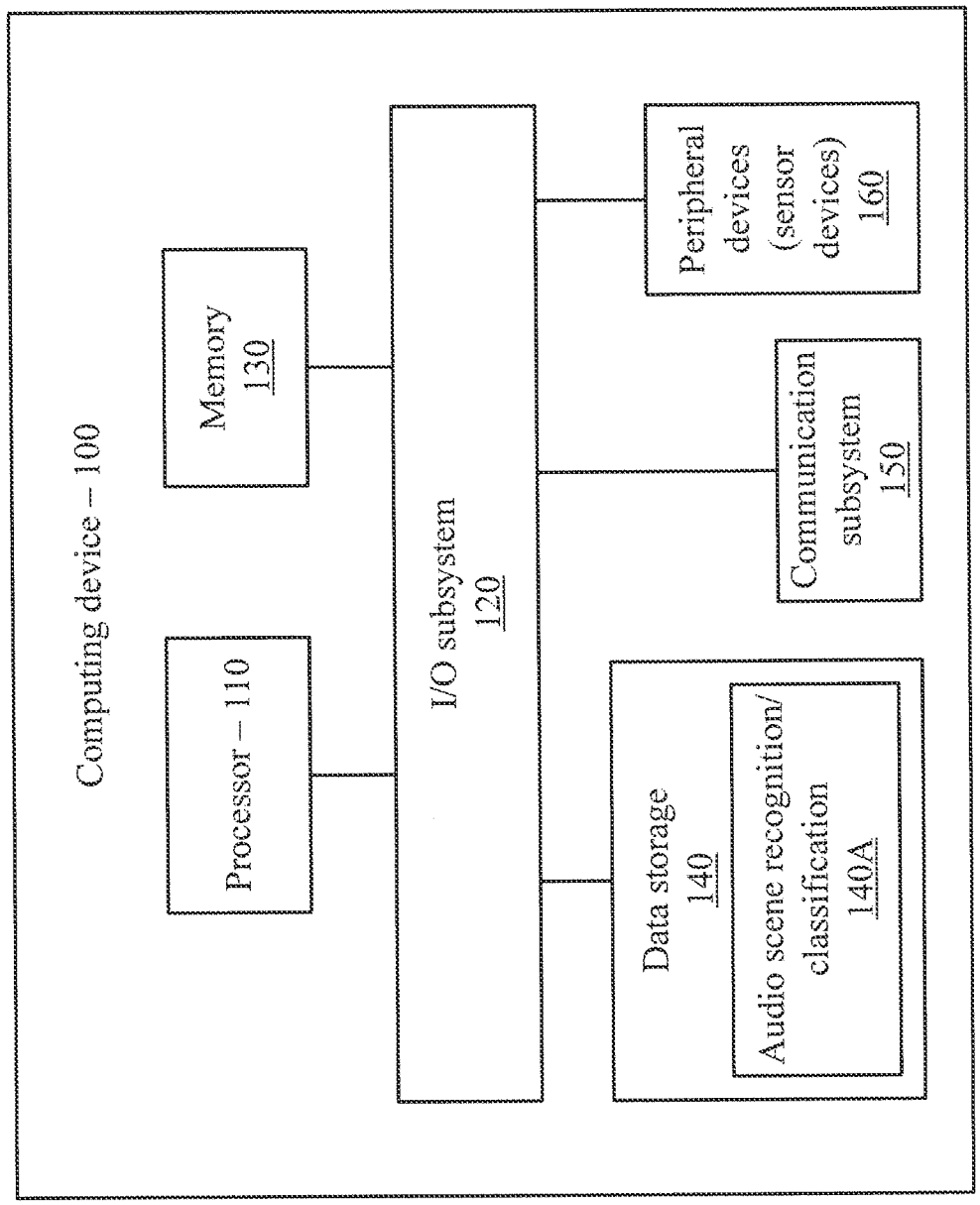
FIG. 1 is a block diagram showing an exemplary computing device, in accordance with an embodiment of the present invention.

In accordance with embodiments of the present invention, systems and methods are provided for audio scene recognition using time series analysis.

Time series analysis is an important branch of data science that deals with the analysis of data collected from one or multiple sensors over time. Based on the observation that audio data is time series, the present invention provides an end-to-end architecture to use time series data analysis to analyze audio data.

The observation that lies at the base of various embodiments of the present invention is that the basic audio features of an audio scene (obtained after the signal processing) form a multi-varied times series, where each feature corresponds to a sensor and its value represents the sensor readings over time.

In accordance with one or more embodiments of the present invention, a multi-varied time series analysis tool is provided called Data2Data (D2D). D2D learns representations (or embeddings) of time series data and uses them to perform fast retrieval, i.e., given a query time series segment, identify the most similar historical time series segment. Retrieval is an important building block for the classification of time series.

One or more embodiments of the present invention provide audio scene analysis for time series analysis. To interpret audio scenes as time series data, the audio scenes can be fed into the D2D platform to perform fast retrieval for classification and anomaly detection.

Thus, one or more embodiments of the present invention present a deep learning framework to accurately classify an audio environment after "listening" for less than a second. The framework relies on a combination of recurrent neural networks and attention to learn embeddings for each audio segment. A main feature to the learning process is an optimization mechanism that minimizes an audio loss function. This function is constructed to encourage embeddings to preserve segment similarity (through a distance-based component) and penalize nondescript segments while capturing the importance of the more relevant ones (through an importance-based component).

One or more embodiments of the present invention generate intermediate audio features and classify them using a nearest neighbor classifier. The intermediate audio features attempt to both capture correlations between different acoustic windows in the same scene and isolate and weaken the effect of "uninteresting" features/sections, such as silence or noise. To learn the intermediate audio features, basic Mel-Frequency Cepstral Coefficients (MFCC) audio features are first generated. The whole scene is then divided into (possibly overlapping) windows and the basic features of each window are fed into LSTM units. The hidden state of each LSTM unit (there are as many hidden states as time steps in the current window) is taken and passed through an attention layer to identify correlations between the states at different time steps. To generate the final intermediate feature for each window, the triplet loss function is optimized, to which is added a regularization parameter computed on the last element of each intermediate feature. The goal of the regularization parameter is to reduce the importance of the silence segments.

Thus, one or more embodiments of the present invention study audio scene classification (ASC), that is, the task of identifying the category of the surrounding environment using acoustic signals.

To achieve a goal of early detection, the ASC is formulated as a retrieval problem. This allows us to split the audio data into short segments (of less than a second), learn embeddings for each segment, and use the embeddings to classify each segment as soon as it is "heard". Given a query segment (e.g., short sound from the environment), the query segment is classified in the class of the most similar historical segment, according to an embedding similarity function, such as the Euclidean distance.

A natural question is how can embeddings be found that enable fast and accurate retrieval of short audio segments. Good embeddings must satisfy two criteria. First, they must preserve similarity: segments belonging to the same audio scene category should have similar embeddings. Second, they must capture the importance of each segment within a scene. For example, in a playground scene, the segments including children laughter are more relevant for the scene; in contrast, silence or white noise segments are less important since they can be found in many other types of scenes.

FIG. 1 is a block diagram showing an exemplary computing device 100, in accordance with an embodiment of the present invention. The computing device 100 is configured to perform audio scene recognition.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for audio scene recognition/classification. The program code can control a hardware processor-based device in response to a recognition/classification result. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, sensor devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
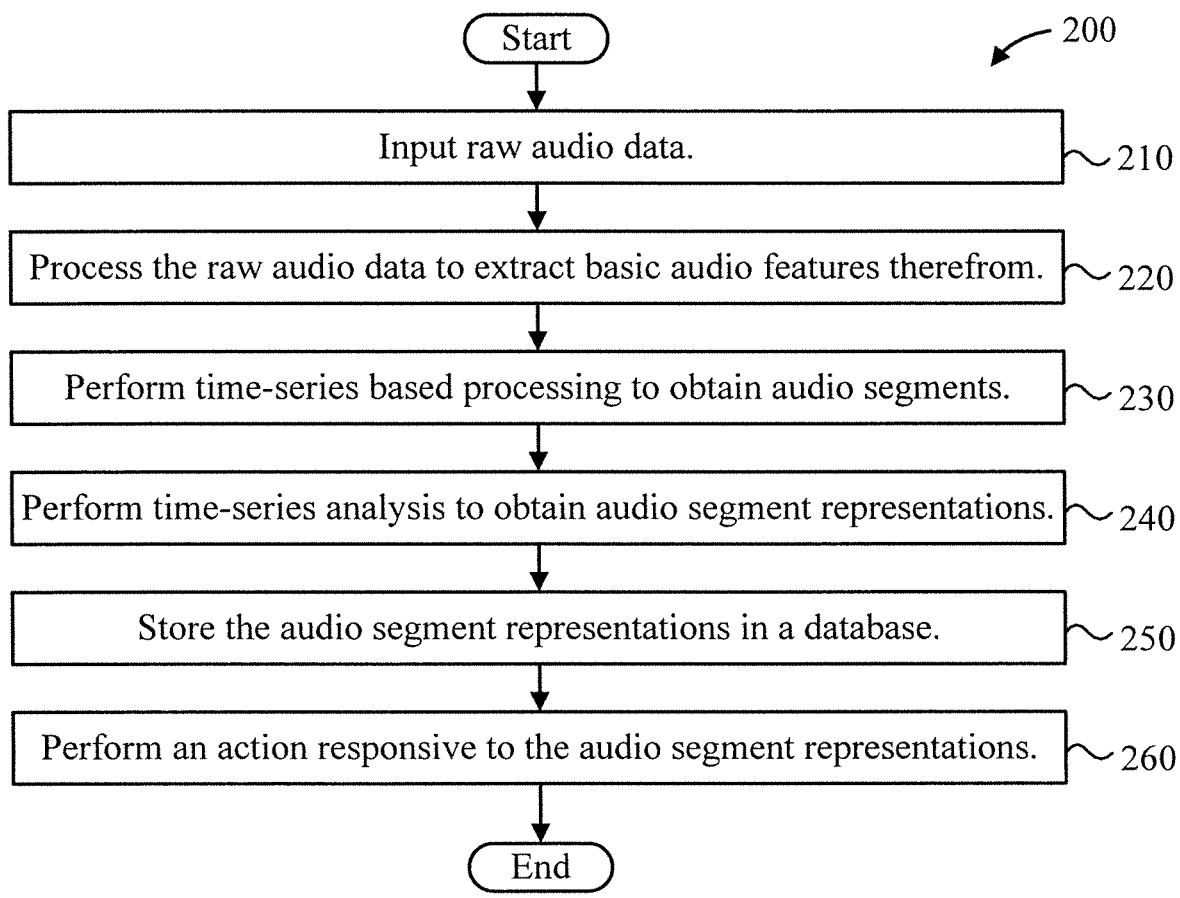
FIG. 2. is a flow diagram showing an exemplary method for audio scene recognition, in accordance with an embodiment of the present invention.

These and other variations of a hardware processor subsystem are also contemplated in accordance with embodiments of the present invention FIG. 2. is a flow diagram showing an exemplary method 200 for audio scene recognition, in accordance with an embodiment of the present invention.

At block 210, input raw audio data.

At block 220, process the raw audio data to extract basic audio features therefrom.

At block 230, perform time-series based processing to obtain audio segments.

At block 240, perform time-series analysis to obtain audio segment representations.

At block 250, store the audio segment representations in a database.

At block 260, perform an action responsive to the audio segment representations.

Various ones of the blocks of method 200 will now be described in further detail in accordance with various embodiments of the present invention.

Raw audio processing (block 220). The input is the raw audio data and the output is represented by basic audio features obtained after applying signal processing techniques. The audio data is processed by applying multiple transformations as follows. First, the signal is broken into multiple overlapping frames with the size of each frame of 25 ms. The Fast Fourier Transform is then applied on each frame to extract the energy levels for each frequency present in the sound. The frequency levels on the Mel scale are then mapped to better match the hearing abilities of the human ear. Finally, the cosine transform is applied on the logs of the Mel powers to obtain the Mel-frequency Cepstral Coefficients (MFCCs). MFCCs are strong basic audio features for scene recognition. Alternatively, the method can be terminated after applying the FFT and the frequency spectrum powers can be used as the basic audio features.

Time-series based processing (block 230). The entire training data is now represented as basic audio feature vectors over time. If each feature is considered equivalent to a sensor and the values of the feature over time are considered as values collected from the sensor, the entire training data can be envisioned as a multi-varied time series. The data is split into multiple, possibly overlapping segments. Each segment includes all basic audio feature vectors over a time range defined by the user. Splitting the data into overlapping short-range windows is typical for time series analysis and enables better capture of short-range dependencies and correlations in the sound.

Time-series analysis (block 240). Each audio segment is fed into our Data2Data (D2D) framework. Each basic audio feature vector in a segment is the input of an LSTM unit. The unit continually updates its state as it reads more and more audio features. The final output of the LSTM is the representation of the segment and captures dependencies between the audio feature vectors that are part of the segment. All representations are saved to a database and used later for retrieval.

Figure 3:
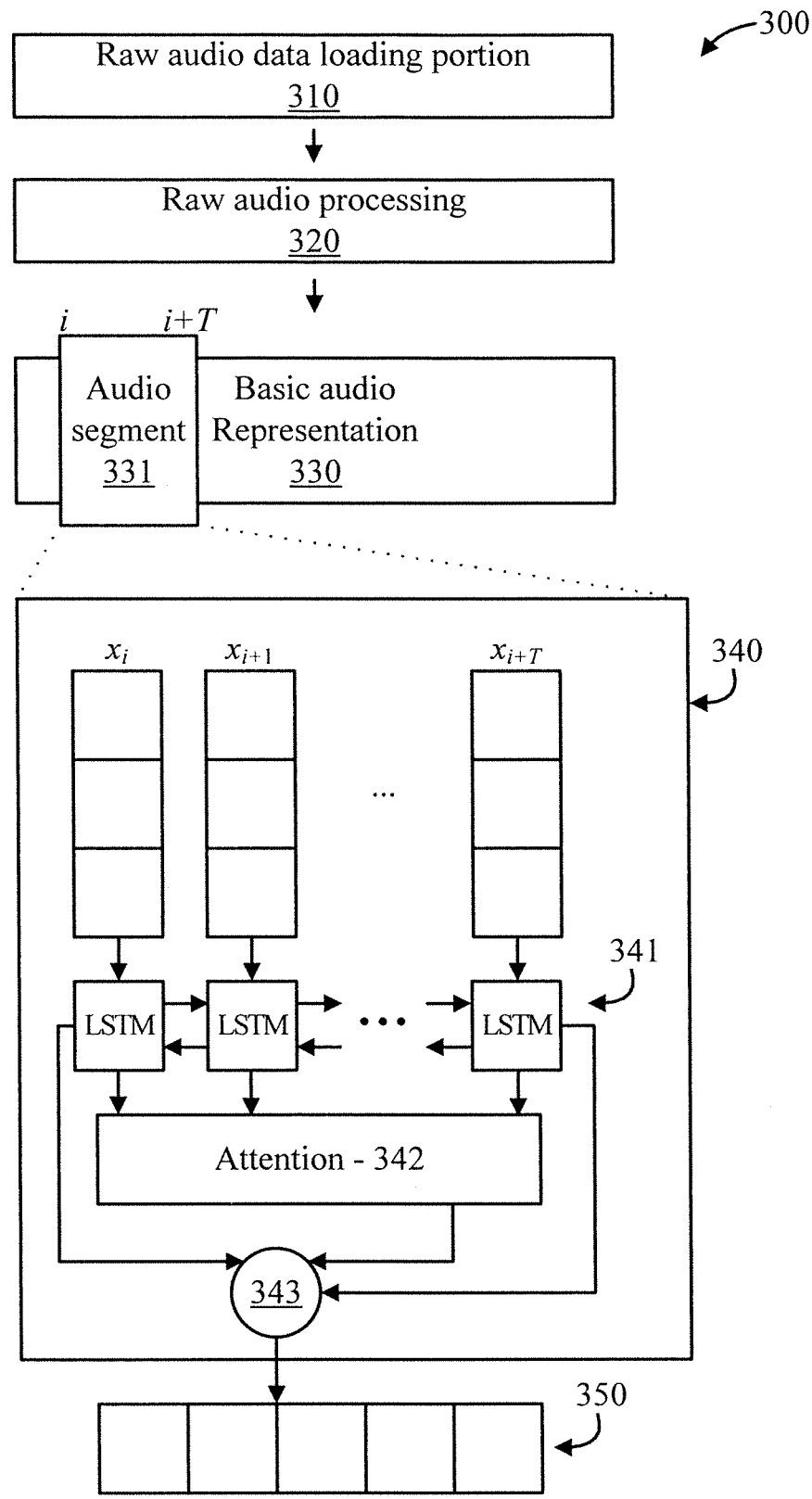
FIG. 3. is a high-level diagram showing an exemplary audio scene recognition architecture, in accordance with an embodiment of the present invention.

FIG. 3. is a high-level diagram showing an exemplary audio scene recognition architecture 300, in accordance with an embodiment of the present invention.

The audio scene recognition architecture 300 includes a raw audio data loading portion 310, a raw audio processing portion 320, a basic audio feature segmentation portion 330, and an intermediate audio feature learning portion 340.

The basic audio feature segmentation portion 330 includes an audio segment 331.

The intermediate audio feature learning portion 340 includes a LSTM portion 341, an attention portion 342, and a final representation (feature) portion 343.

Raw audio data loading 310. This element loads from file the set of audio scenes used for training and their labels. In an embodiment, the data is in way format. Of course, other formats can be used. All training data is concatenated such that it appears as one long audio scene.

Raw audio processing portion 320. The audio data is processed by applying multiple transformations as follows. First, the signal is broken into multiple overlapping frames with the size of each frame of 25 ms. The Fast Fourier Transform is applied on each frame to extract the energy levels for each frequency present in the sound. The frequency levels are mapped on the Mel scale to better match the hearing abilities of the human ear. Finally, the cosine transform is applied on the logs of the Mel powers to obtain the Mel-frequency Cepstral Coefficients (MFCCs). Previous research has shown that MFCCs are strong basic audio features for scene recognition. Alternatively, the method can be terminated after applying the FFT and the frequency spectrum powers can be used as the basic audio features.

Basic audio feature segmentation portion 330. The entire training data is now represented as a vector of basic audio feature vectors. To capture dependencies among different basic audio feature vectors, the data is split into multiple, possibly overlapping segments. Each segment includes all basic audio feature vectors over a time range defined by the user.

Intermediate audio feature learning portion 340. Each audio segment is fed into a deep architecture composed of a recurrent layer and an attention layer.

LSTM portion 341. Each basic audio feature vector in a segment is the input of an LSTM unit. The unit continually updates its state as it reads more and more audio features. The final output of the LSTM unit can be seen as a representation of the segment that captures long-term dependencies between the audio feature vectors that are part of the segment. A bidirectional LSTM is used which means that each segment is fed in temporal order and in reverse temporal order, obtaining two final representations.

Attention portion 342. The two final representations obtained from the recurrent layer may not be sufficient to capture all correlations between basic feature vectors of the same segment. An attention layer is used to identify correlations between LSTM states at various times. The input to the attention layer is represented by the hidden states of LSTM across all time steps of the segment.

Final representation (feature) portion 343. To obtain the final intermediate feature 350, the two LSTM final outputs are concatenated and the results are multiplied with the attention weights.

Figure 4:
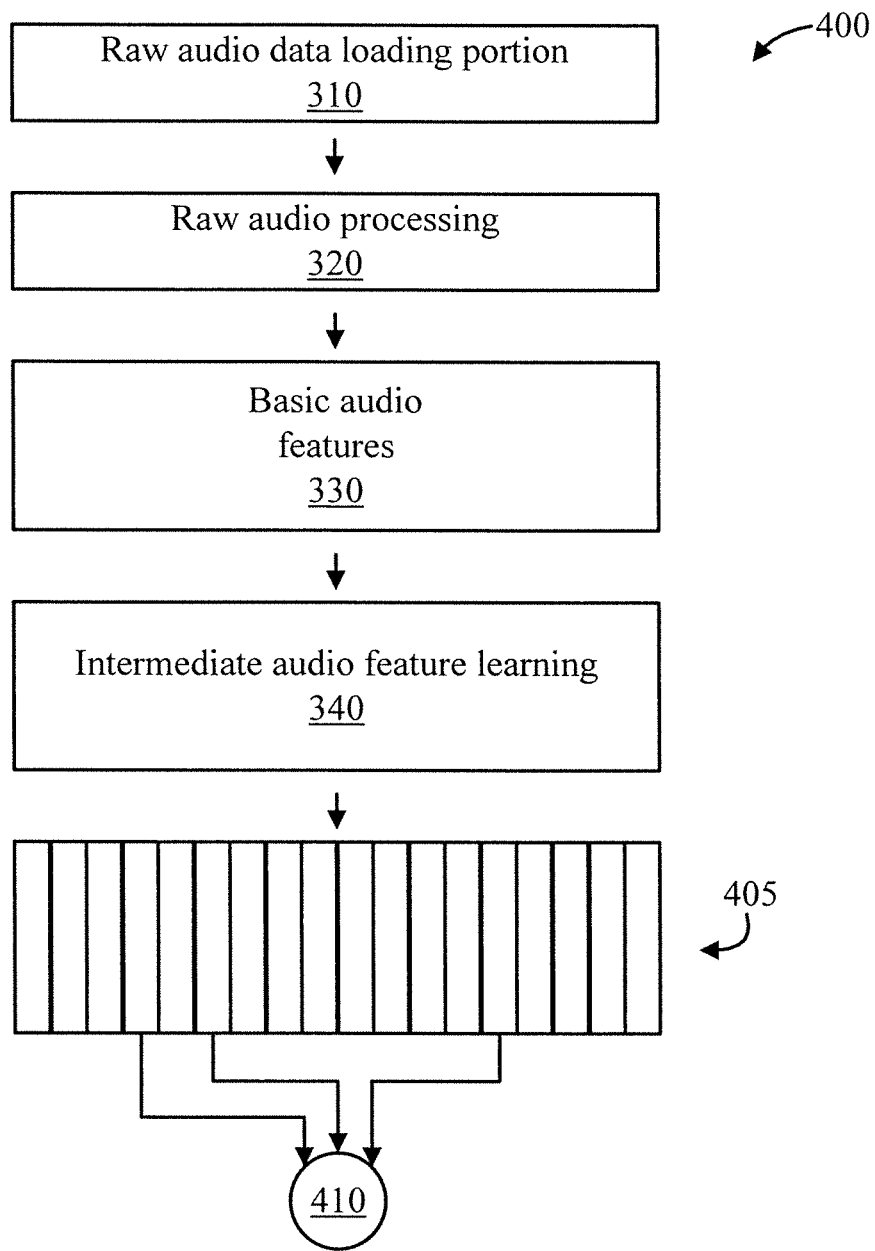
FIG. 4 is a block diagram further showing the intermediate audio feature learning portion of FIG. 3, in accordance with an embodiment of the present invention.

FIG. 4 is a block diagram further showing the intermediate audio feature learning portion 340 of FIG. 3, in accordance with an embodiment of the present invention.

FIG. 4 shows the optimization step used to learn the intermediate audio features. At each iteration of the learning, it is attempted to minimize a loss function computed using the current intermediate features of a randomly selected batch of segments. The weights and biases of the deep network (block 340) are backpropagated and updated. The loss function 410 to be minimized is composed of two different quantities as follows:

$$Loss=AudioTripletLoss+SilenceRegularization$$

AudioTripletLoss 410 is based on the classic triplet loss. To compute the triplet loss 410, two segments are selected that are part of the same class and one that is part of a different class and it is attempted to bring the intermediate features 405 of the same class segments closer and those of the different class segments further. The silence weight is defined as the last element in the representation of each segment. The silence weight is likely to be low if the segment is silence. The AudioTripletLoss 410 is computed by multiplying the triplet loss with the silence weights of each of the segments in the triplet. The reasoning behind this is that silence segments, even when part of different classes, are similar and should not contribute to the learning (i.e., their representations should not be pushed apart by the optimization).

In addition to triplet loss, a new term is added, called SilenceRegularization. The SilenceRegularization is the sum of the silence weights and is intended to dissuade the silence weights from becoming 0 all at the same time.

Figure 5:
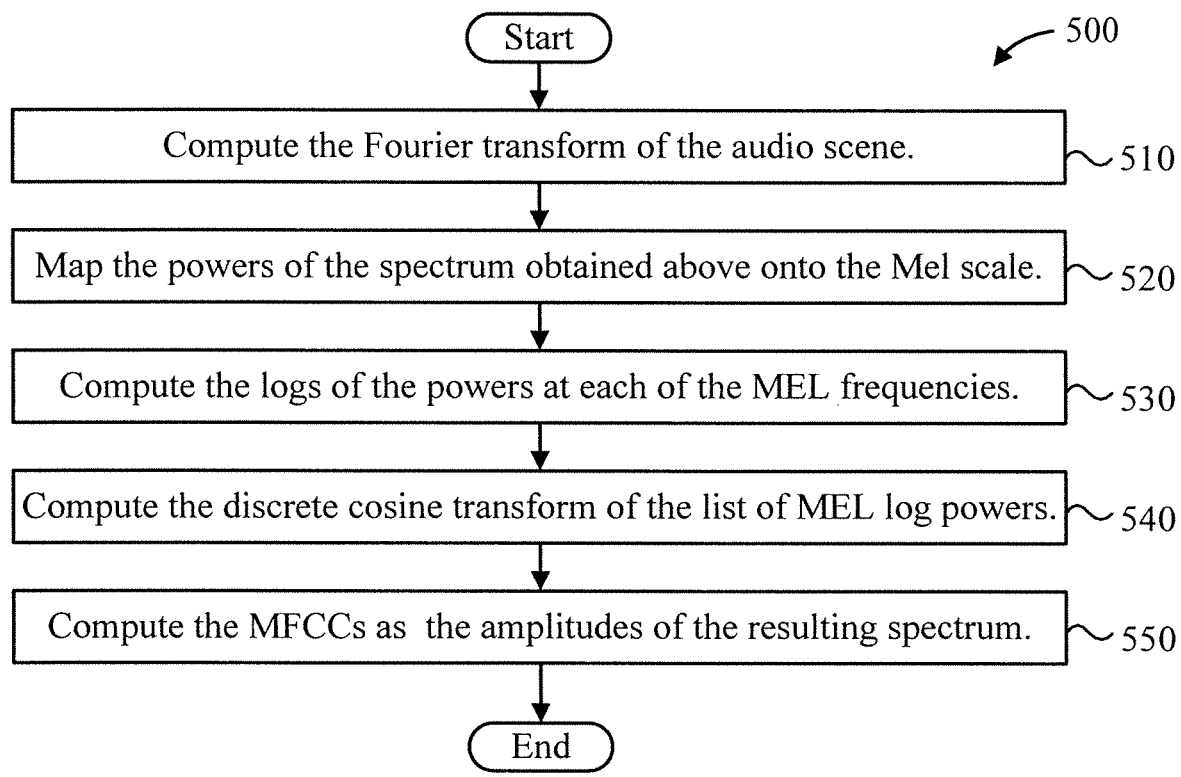
FIG. 5 is a flow diagram further showing an exemplary method for the intermediate audio feature learning portion of FIG. 3, in accordance with an embodiment of the present invention.

FIG. 5 is a flow diagram further showing the intermediate audio feature learning portion 340 of FIG. 3, in accordance with an embodiment of the present invention.

At block 510, compute the Fourier transform of the audio scene.

At block 520, map the powers of the spectrum obtained above onto the Mel scale.

At block 530, compute the logs of the powers at each of the MEL frequencies.

At block 540, compute the discrete cosine transform of the list of MEL log powers.

At block 550, compute the MFCCs as the amplitudes of the resulting spectrum. Three components of our audio scene classification architecture will now be described as follows: raw audio processing to generate basic audio features; the encoder to compute high-level audio segment representations; and the loss function optimization to guide the computation of good embeddings. Some of the contributions of the present invention lie in the encoder and loss optimization.

A description will now be given regarding raw audio processing, in accordance with an embodiment of the present invention.

Each audio scene is decomposed using windowed FFT and extract 20 Mel frequency cepstral coefficients. Their first derivatives are added and 12 harmonic and percussive features, known to enhance the raw feature set, to obtain 52 basic audio features for each FFT window.

Let $X=(x^1, x^2, \ldots, x^n)^T \in \mathbb{R}^{n \times T}$ represent an audio segment of length T (e.g., of T consecutive FFT windows) with n basic features (where n=52). Each segment is associated with the label of the scene to which it belongs. One goal is audio segment retrieval: given a query segment, find the most similar historical segments using a similarity measure function, such as the Euclidean distance. The query segment is then classified in the same category as the most similar historical segment.

A description will now be given regarding learning embedding, in accordance with an embodiment of the present invention.

To perform fast and efficient retrieval, compact representations for each historical audio segment are learned and the representations rather than the basic audio features are compared. It is presumed that the embedding is given by the following mapping function:

$$h = \mathcal{F}(X) \tag{1}$$

where $X \in \mathbb{R}^{n \times T}$ is an audio segment of n basic features over T time steps and $h \in \mathbb{R}^d$ is an embedding vector of size d. F is a non-linear mapping function.

A combination of bidirectional LSTM and attention is used to compute F. A LSTM is chosen to capture long-term temporal dependencies and attention to emphasize the more important audio parts in a segment. To capture correlations between audio at different time steps in a segment, all LSTM hidden states from every time step are fed into an attention layer, which encodes the importance of each time step using a non-linear score function $attn_{score(h_t)} = \tanh(h_t V + b)$. V and b are learned jointly with F. The scores are normalized using softmax as follows:

$$a_t = \frac{\exp(attn_{score(h_t)})}{\sum_{i=1}^{T} \exp(attn_{score(h_t)})} \tag{2}$$

and compute the embedding of the segment as the weighted average of each hidden state:

$$h = \Sigma_{i=1}^{T} a_t h_t \tag{3}$$

Our encoding architecture is reminiscent of the neural machine translation in that it combines LSTM and attention. However, self-attention is computed between the encoder hidden states rather than attention between the decoder current state and the encoder hidden states.

Other deep encoders that preserve audio segment similarity may be used to compute embeddings, recurrent networks and attention mechanism are efficient in identifying important features in audio. The present invention focuses on providing accurate early detection, given a reasonably accurate encoder.

A description will now be given regarding loss, in accordance with an embodiment of the present invention.

The loss function is constructed to satisfy two criteria. First, it must encourage embeddings to reflect class membership. In other words, segments part of the same class should have similar embeddings, segments part of different classes different embeddings. This goal is achieved by using a distance-based component, such as the triplet loss:

$$\mathcal{L}_{similarity} = \max(\|\mathcal{F}(a) - \mathcal{F}(p)\|^2 - \|\mathcal{F}(a) - \mathcal{F}(n)\|^2 + \alpha, 0) \tag{4}$$

where a, p, and $n \in X$, are audio segments, such that a and p have the same label and a and n have different labels. The second criteria is informed by our goal to classify scenes quickly. It is desirable to be able to detect environmental sounds after listening in for as little as possible. Thus, it is desired to emphasize the segments that can discriminate a scene (e.g., children laughter in a playground scene) and underplay those that are less descriptive (e.g., silence, white noise). To capture the importance of each segment, an audio importance score is defined. The importance score is a linear projection of the segment embedding, which is learned jointly with the encoder. The score is normalized using softmax, similar to Equation 2, to obtain the importance weight, $w_i$, of each segment and use it to compute the total loss:

$$\mathcal{L} = (\Pi w_i) \mathcal{L}_{similarity} + \alpha_{audio(-\Sigma w_i)} \tag{5}$$

where $w_i$ represents the weights of the segments used to compute $\mathcal{L}_{similarity}$, e.g., a, p, and n from Equation 4 and $\alpha_{audio}$ is a regularization parameter. The first term of the equation ensures that only important segments are used in the triplet loss computation, while the second term attempts to maximize the weights of such segments.

The attention and importance scores are complementary in highlighting the discriminative segments in an audio scene. The attention score helps identify the useful time steps within a segment, while the importance score helps retrieve the relevant segments within a scene.

Figure 6:
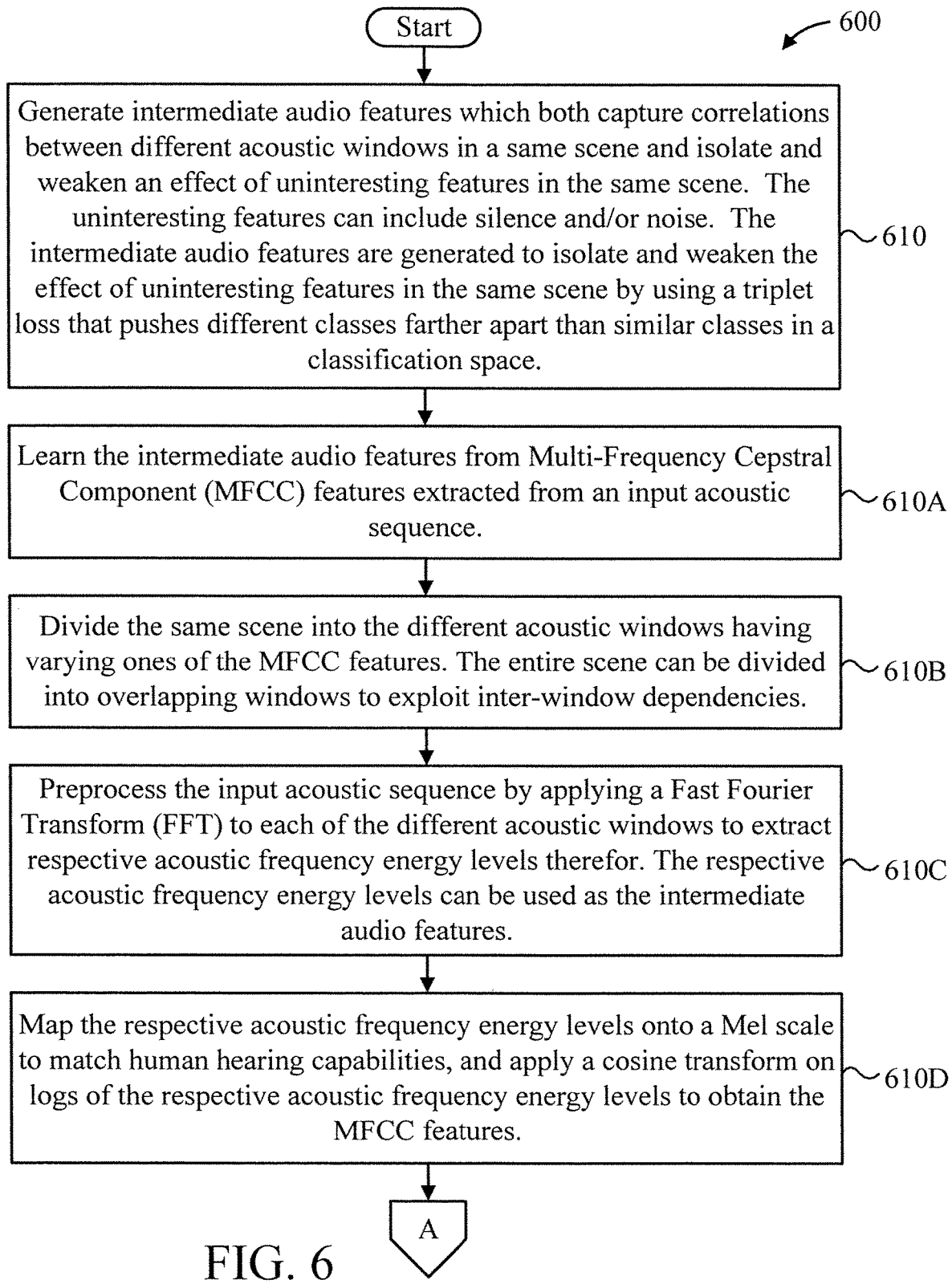
FIGS. 6-7 are flow diagrams showing an exemplary method for audio scene classification, in accordance with an embodiment of the present invention.
Figure 7:
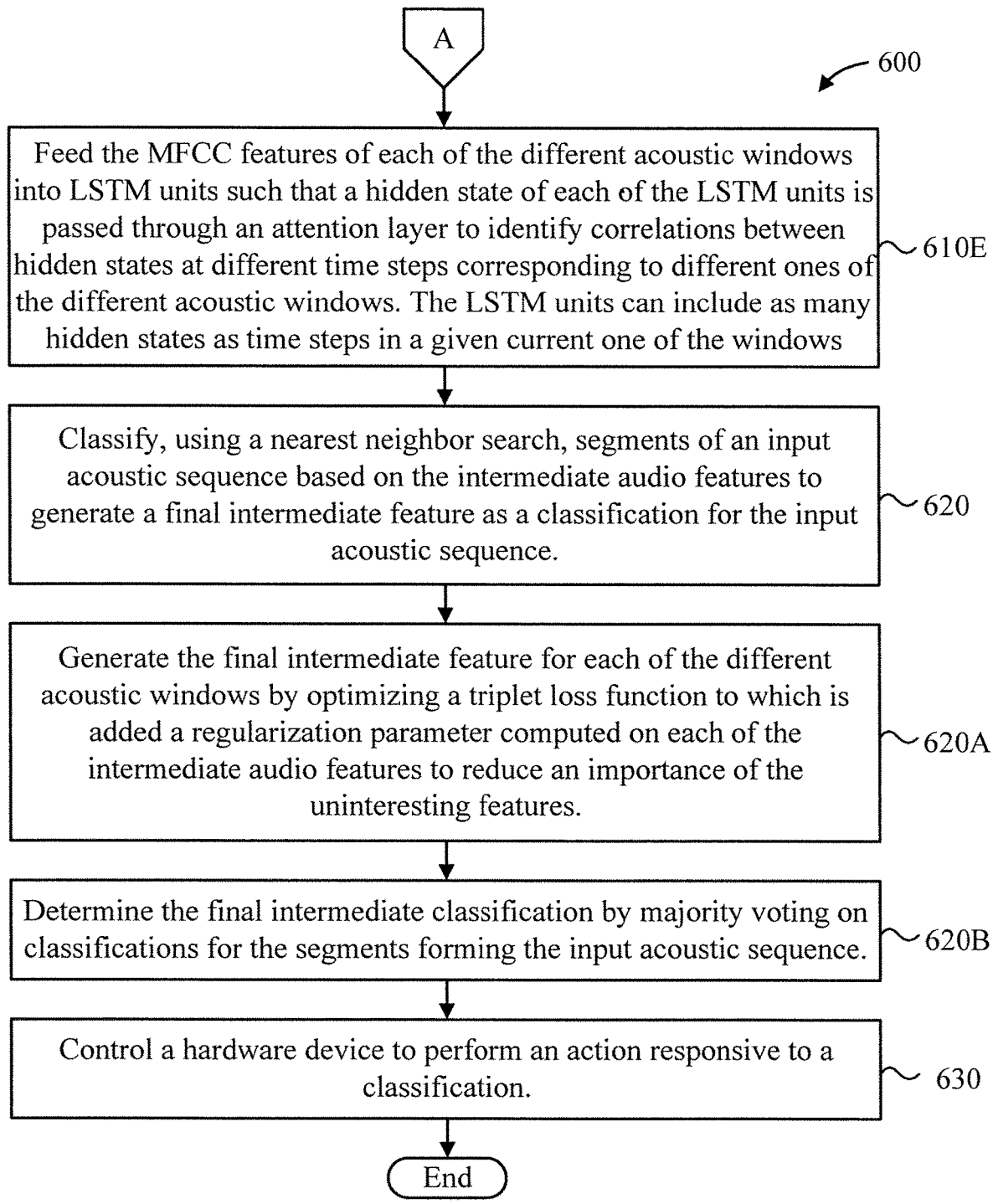

FIGS. 6-7 are flow diagrams showing an exemplary method 600 for audio scene classification, in accordance with an embodiment of the present invention.

At block 610, generate intermediate audio features which both capture correlations between different acoustic windows in a same scene and isolate and weaken an effect of uninteresting features in the same scene. In an embodiment, the uninteresting features can include silence and/or noise. The intermediate audio features are generated to isolate and weaken the effect of uninteresting features in the same scene by using a triplet loss that pushes different classes farther apart than similar classes in a classification space.

In an embodiment, block 610 can include one or more of blocks 510A through 510C.

At block 610A, learn the intermediate audio features from Multi-Frequency Cepstral Component (MFCC) features extracted from an input acoustic sequence.

At block 610B, divide the same scene into the different acoustic windows having varying ones of the MFCC features. In an embodiment, the entire scene can be divided into overlapping windows to exploit inter-window dependencies.

At block 610C, preprocess the input acoustic sequence by applying a Fast Fourier Transform (FFT) to each of the different acoustic windows to extract respective acoustic frequency energy levels therefor. In an embodiment, the respective acoustic frequency energy levels can be used as the intermediate audio features.

At block 610D (in the case where the respective acoustic frequency energy levels are not used as the intermediate audio features), map the respective acoustic frequency energy levels onto a Mel scale to match human hearing capabilities, and apply a cosine transform on logs of the respective acoustic frequency energy levels to obtain the MFCC features.

At block 610E, feed the MFCC features of each of the different acoustic windows into LSTM units such that a hidden state of each of the LSTM units is passed through an attention layer to identify correlations between hidden states at different time steps corresponding to different ones of the different acoustic windows. In an embodiment, the LSTM units can include as many hidden states as time steps in a given current one of the windows At block 620, classify, using a nearest neighbor search, segments of an input acoustic sequence based on the intermediate audio features to generate a final intermediate feature as a classification for the input acoustic sequence.

In an embodiment, block 620 can include one or more of blocks 620A and 620B.

At block 620A, generate the final intermediate feature for each of the different acoustic windows by optimizing a triplet loss function to which is added a regularization parameter computed on each of the intermediate audio features to reduce an importance of the uninteresting features.

At block 620B, determine the final intermediate classification by majority voting on classifications for the segments forming the input acoustic sequence.

In an embodiment, the regularization parameter is computed on a last element of each of the intermediate audio features, wherein the last element is a silence weight.

At block 630, control a hardware device to perform an action responsive to a classification.

Exemplary actions can include, for example, but are not limited to, recognizing anomalies in computer processing systems and controlling the system in which an anomaly is detected. For example, a query in the form of acoustic time series data from a hardware sensor or sensor network (e.g., mesh) can be characterized as anomalous behavior (dangerous or otherwise too high operating speed (e.g., motor, gear junction), dangerous or otherwise excessive operating heat (e.g., motor, gear junction), dangerous or otherwise out of tolerance alignment (e.g., motor, gear junction, etc.) using a text message as a label/classification once compared to historical sequences. Accordingly, a potentially faulty device may be turned off, its operating speed reduced, an alignment (e.g., hardware-based) procedure be performed, and so forth, based on the implementation.

Another exemplary action can be operating parameter tracing where a history of the parameters change over time can be logged as used to perform other functions such as hardware machine control functions including turning on or off, slowing down, speeding up, positionally adjusting, and so forth upon the detection of a given operation state equated to a given output classification.

Exemplary environments where the present invention can be deployed include, but are not limited to, power plants, information technology systems, manufacturing plants, computer processing systems (e.g., server farms, memory pools, etc.), multimedia retrieval (automatic tagging of sports or music scenes), intelligent monitoring systems (identify specific sounds in the environment), acoustic surveillance, search in audio archives, cataloging and indexing, and so forth. These and other environments are readily contemplated by one of ordinary skill in the art, given the teachings of the present invention provided herein.

Figure 8:
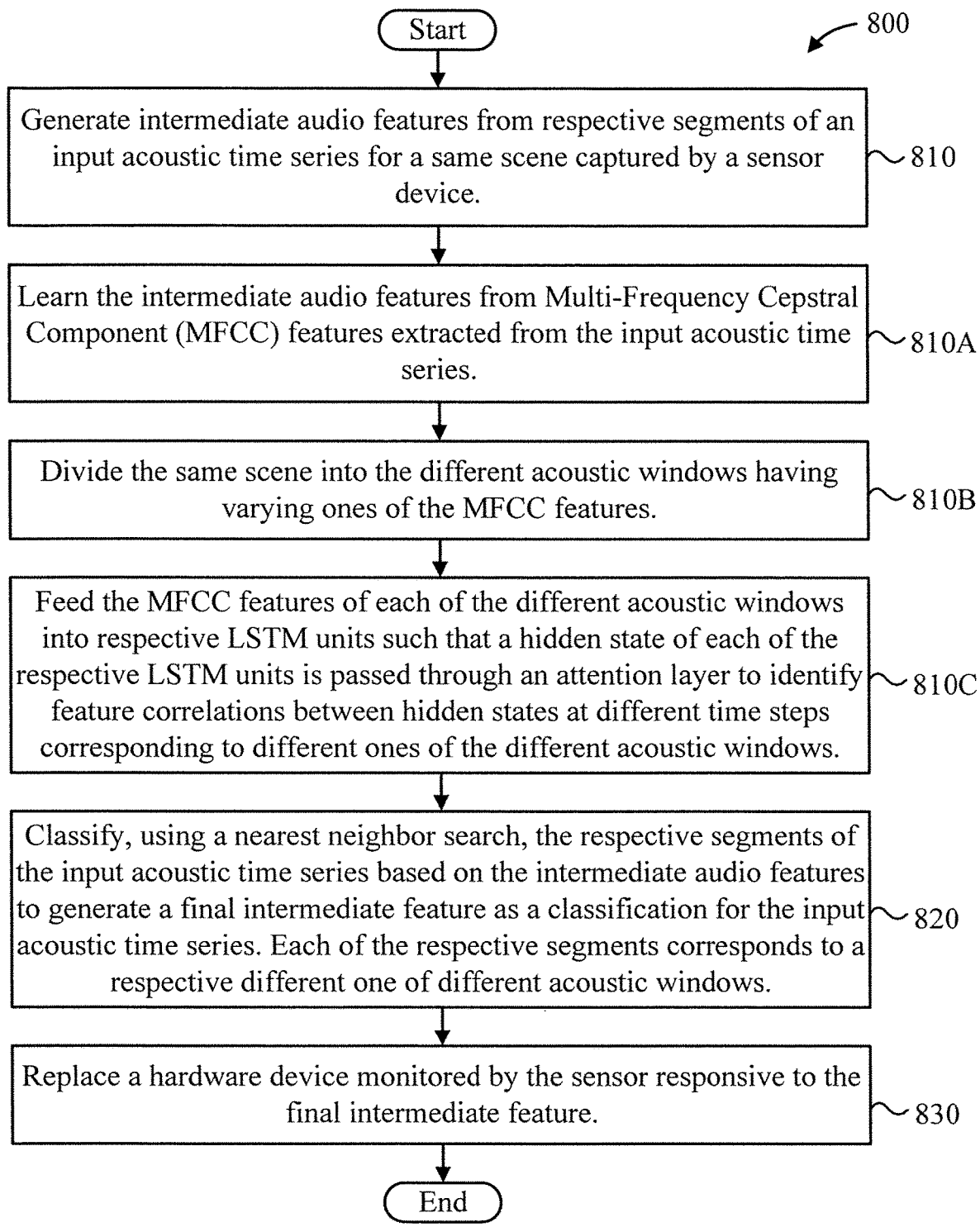
FIG. 8 is a flow diagram showing an exemplary method for time-series based audio scene classification, in accordance with an embodiment of the present invention.

FIG. 8 is a flow diagram showing an exemplary method 800 for time-series based audio scene classification, in accordance with an embodiment of the present invention.

At block 810, generate intermediate audio features from respective segments of an input acoustic time series for a same scene captured by a sensor device.

In an embodiment, block 810 includes one or more of block 810A through 810C.

At block 810A, learn the intermediate audio features from Multi-Frequency Cepstral Component (MFCC) features extracted from the input acoustic time series.

At block 810B, divide the same scene into the different acoustic windows having varying ones of the MFCC features.

At block 810C, feed the MFCC features of each of the different acoustic windows into respective LSTM units such that a hidden state of each of the respective LSTM units is passed through an attention layer to identify feature correlations between hidden states at different time steps corresponding to different ones of the different acoustic windows.

At block 820, classify, using a nearest neighbor search, the respective segments of the input acoustic time series based on the intermediate audio features to generate a final intermediate feature as a classification for the input acoustic time series. Each of the respective segments corresponds to a respective different one of different acoustic windows.

At block 830, replace a hardware device monitored by the sensor responsive to the final intermediate feature. Or perform another action, such as any of the exemplary actions described herein with respect to a resultant classification.

Figure 9:
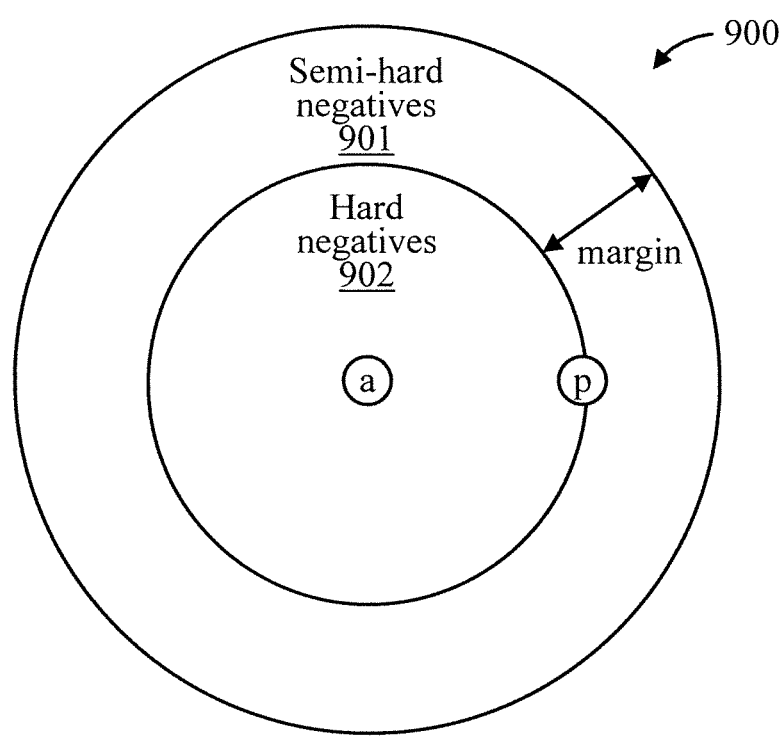
FIG. 9 is a block diagram showing exemplary triplet loss, in accordance with an embodiment of the present invention.

FIG. 9 is a block diagram showing exemplary triplet loss 900, in accordance with an embodiment of the present invention.

The triplet loss involves sampling triplets formed from anchor, positive, and negative samples.

Regarding the negatives sampling, the following applies.

Random: random sample from a different class.

Semi-hard negatives 901: sample negatives which are not closer to the anchor than the positive from a different class, i.e. $d(a,p) < d(a,n) < d(a,p) + margin$.

Hard negatives 902: sample negatives which are closer to the anchor than the positive from a different class, i.e. $d(a,n) < d(a,p)$.

Figure 10:
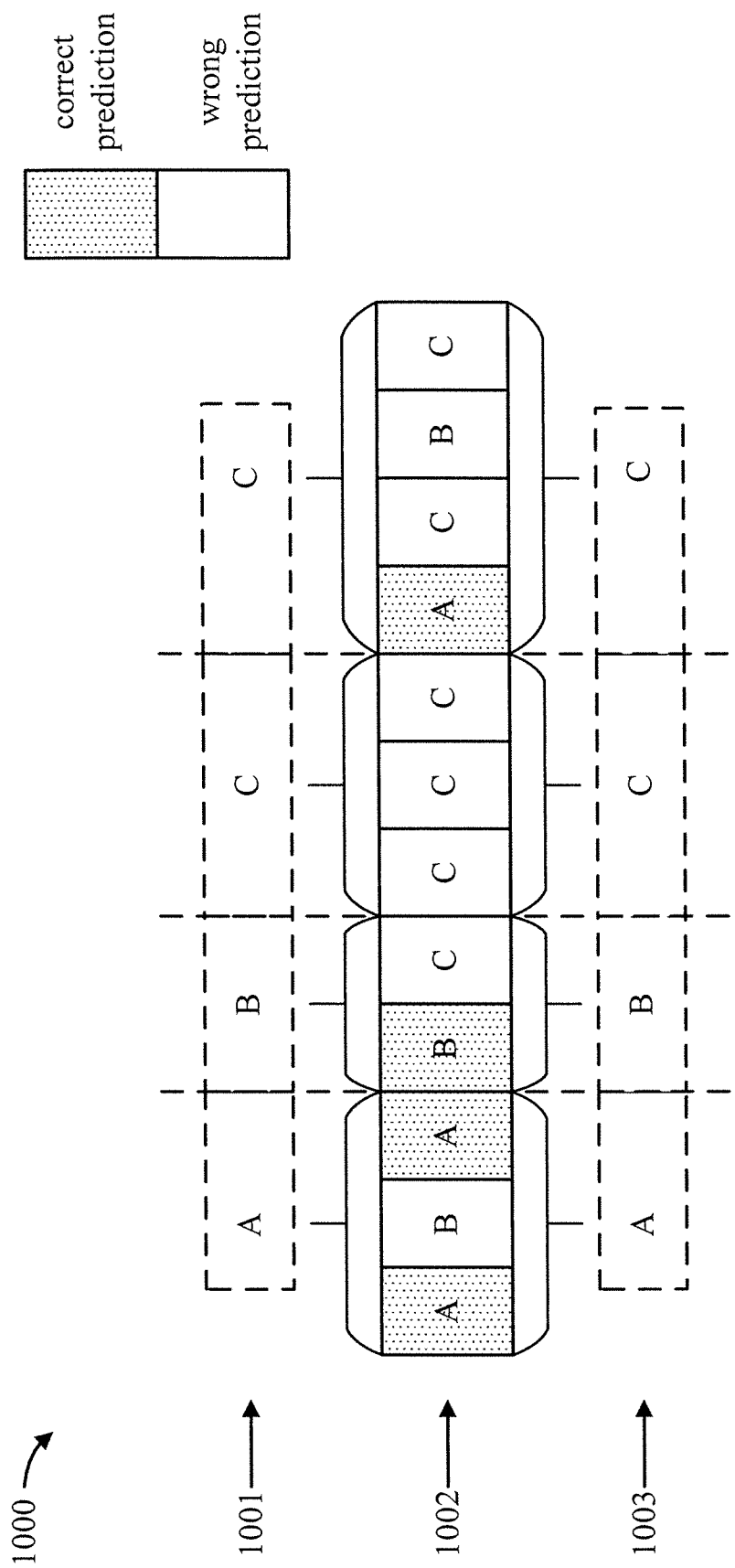
FIG. 10 is a block diagram showing an exemplary scene-based precision evaluation approach, in accordance with an embodiment of the present invention.

FIG. 10 is a block diagram showing an exemplary scene-based precision evaluation approach 1000, in accordance with an embodiment of the present invention.

The approach 1000 involves predicted scene labels 1001, predicted segment labels 1002, and true scene labels 1003.

Approach 1 (scene based precision): for each audio scene, if more than half the segments are correctly predicted, then this scene is deemed correctly predicted.

$$Precision = \frac{True\ Positive}{True\ Positive + False\ Positive}$$

Figure 11:
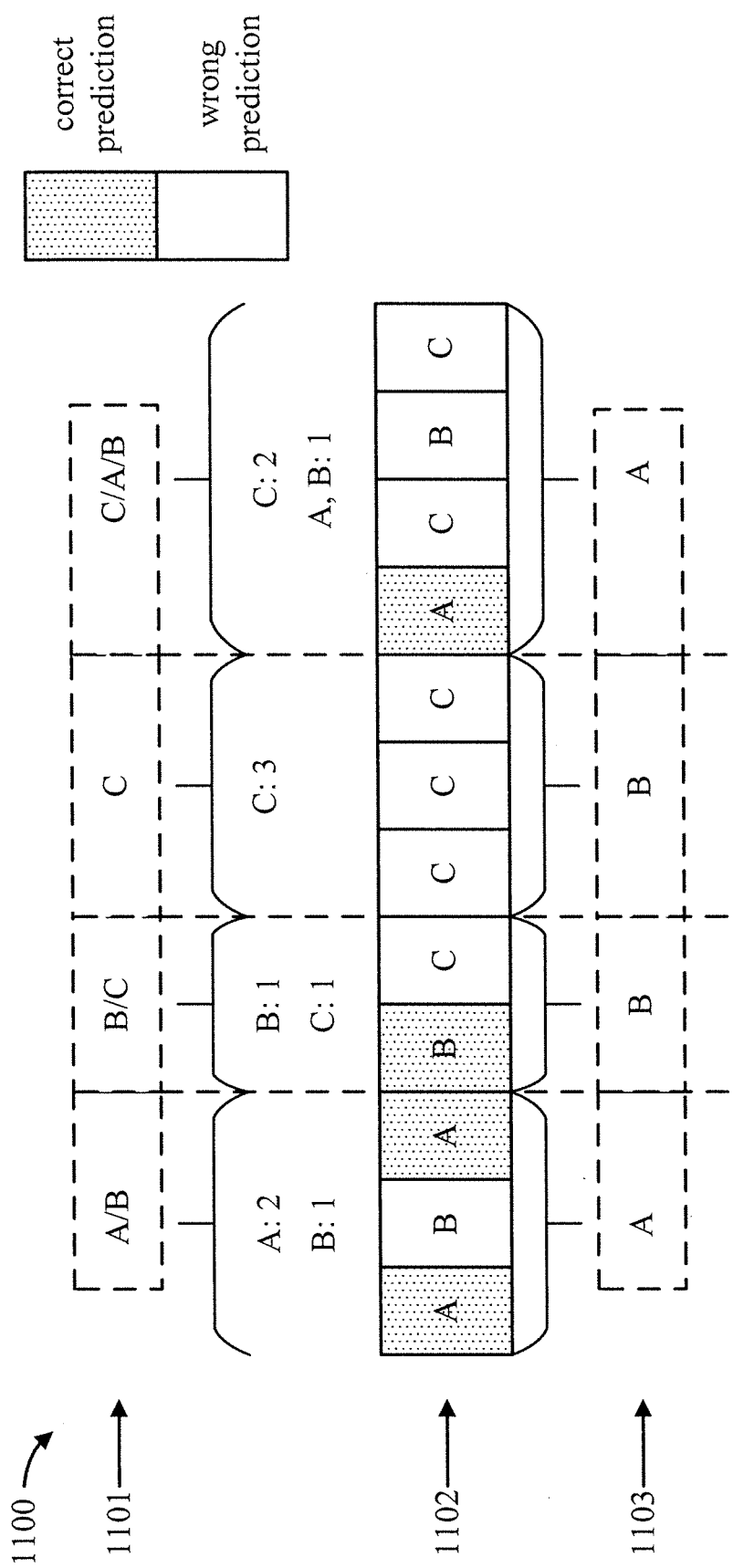
FIG. 11 is a block diagram showing another scene-based precision evaluation approach, in accordance with an embodiment of the present invention.

FIG. 11 is a block diagram showing another scene-based precision evaluation approach 1100, in accordance with an embodiment of the present invention.

The approach 1100 involves predicted scene labels 1101, predicted segment labels 1102, and true scene labels 1103.

Approach 2 (scene-based precision): for each audio scene, the most two frequently predicted labels for segments are counted. If a true label of this audio scene falls into this two labels, then this scene is deemed correctly predicted.

Figure 12:
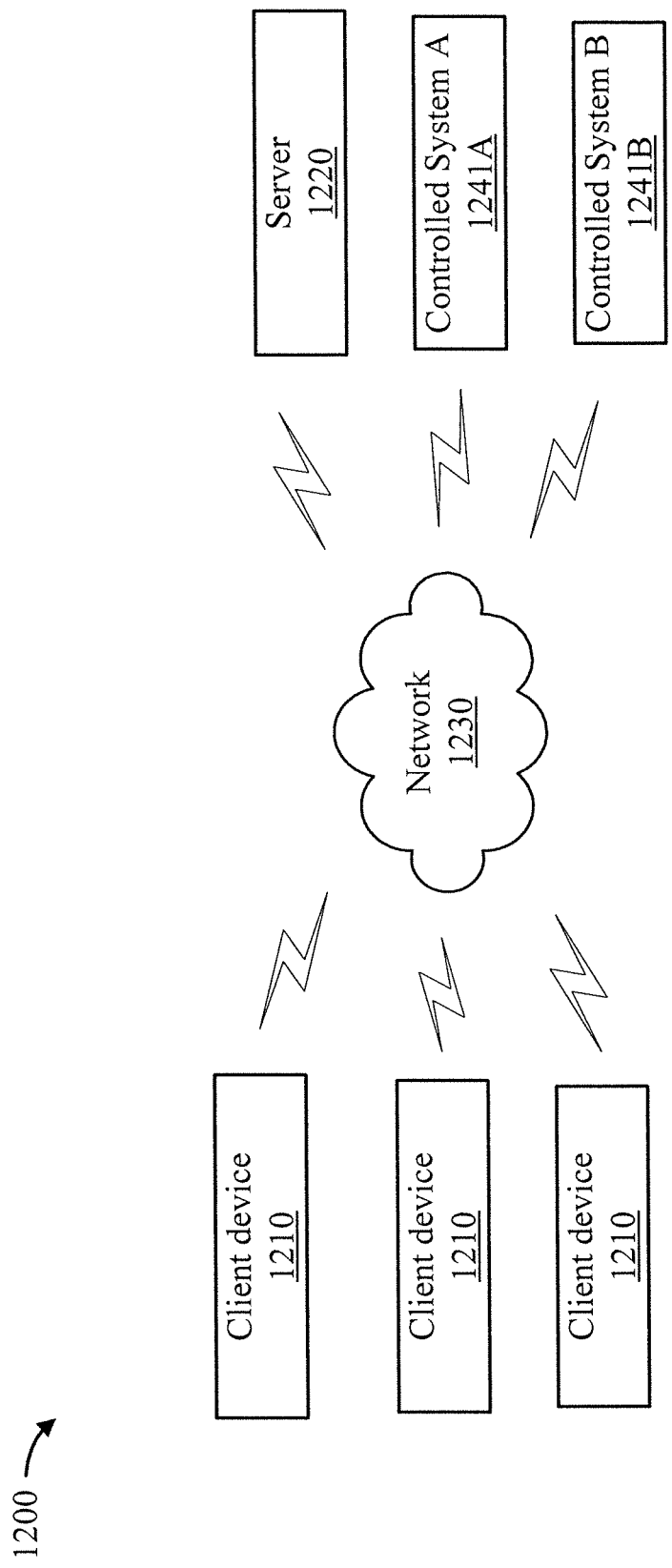
FIG. 12 is a block diagram showing an exemplary computing environment, in accordance with an embodiment of the present invention.

FIG. 12 is a block diagram showing an exemplary computing environment 1200, in accordance with an embodiment of the present invention.

The environment 1200 includes a server 1210, multiple client devices (collectively denoted by the figure reference numeral 1220), a controlled system A 1241, a controlled system B 1242.

Communication between the entities of environment 1200 can be performed over one or more networks 1230. For the sake of illustration, a wireless network 1230 is shown. In other embodiments, any of wired, wireless, and/or a combination thereof can be used to facilitate communication between the entities.

The server 1210 receives time series data from client devices 1220. The server 1210 may control one of the systems 1241 and/or 1242 based on a prediction generated thereby. In an embodiment, the time series data can be data related to the controlled systems 1241 and/or 1242 such as, for example, but not limited to sensor data.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for audio scene classification in an information retrieval system, comprising:
generating intermediate audio features from respective segments of an input acoustic time series for a same scene captured by a sensor device; and
classifying, using a nearest neighbor search, the respective segments of the input acoustic time series based on the intermediate audio features to generate a final intermediate feature as a classification for the input acoustic time series, each of the respective segments corresponding to a respective different one of different acoustic windows;
wherein said generating step comprises:
learning the intermediate audio features from Multi-Frequency Cepstral Component (MFCC) features extracted from the input acoustic time series;
dividing the same scene into the different acoustic windows having varying ones of the MFCC features; and
feeding the MFCC features of each of the different acoustic windows into respective Long Short-Term Memory (LSTM) units such that a hidden state of each of the respective LSTM units is passed through an attention layer to identify feature correlations between hidden states at different time steps corresponding to different ones of the different acoustic windows, and
wherein the method further includes replacing a hardware device monitored by the sensor responsive to the final intermediate feature.

2. The computer-implemented method of claim 1, wherein the intermediate acoustic features both capture feature correlations between different acoustic windows in a same scene and isolate and weaken an effect of uninteresting features in the same scene.

3. The computer-implemented method of claim 1, wherein said classifying step comprises generating the final intermediate feature for each of the different acoustic windows by optimizing a triplet loss function to which is added a regularization parameter computed on each of the intermediate audio features to reduce an importance of the uninteresting features, and wherein the uninteresting features comprise silence.

4. The computer-implemented method of claim 3, wherein the triplet loss function adjusts a triplet selection algorithm to avoid using segments the uninteresting portions as silence and noise by using a silence and noise bias.

5. The computer-implemented method of claim 3, wherein the regularization parameter is computed on a last element of each of the intermediate audio features, the last element being a silence weight.

6. The computer-implemented method of claim 3, wherein the regularization parameter comprises a sum of silence weights and prevents all of the silence weights from simultaneously reaching a value of zero.

7. The computer-implemented method of claim 1, wherein an entirety of the same scene is divided into overlapping windows to exploit inter-window dependencies.

8. The computer-implemented method of claim 1, wherein each of the respective LSTM units comprise as many hidden states as time steps in a given current one of the windows.

9. The computer-implemented method of claim 1, further comprising preprocessing the input acoustic sequence by applying a Fast Fourier Transform (FFT) to each of the different acoustic windows to extract respective acoustic frequency energy levels therefor.

10. The computer-implemented method of claim 1, wherein the intermediate audio features are generated to isolate and weaken the effect of uninteresting features in the same scene using a triplet loss that pushes different classes farther apart than similar classes in a classification space.

11. The computer-implemented method of claim 1, further comprising computing an embedding of the input acoustic time series as the weighted average of each of the hidden states.

12. The computer-implemented method of claim 11, wherein the embedding is the final intermediate feature.

13. The computer-implemented method of claim 1, further comprising receiving a query segment, and finding a most similar historical segment using a nearest neighbor.

14. The computer-implemented method of claim 1, wherein said learning step learns the intermediate audio features by minimizing a loss function computed using the intermediate audio features of a randomly selected batch of segments from the input acoustic sequence.

15. The computer-implemented method of claim 1, wherein the final intermediate feature is determined by majority voting on classifications for the segments forming the input acoustic time series.

16. A computer program product for audio scene classification in an information retrieval system, the computer program product comprising a non-transitory computer readable storage medium having program instructions embodied therewith, the program instructions executable by a computer to cause the computer to perform a method comprising:
generating intermediate audio features from respective segments of an input acoustic time series for a same scene captured by a sensor device; and
classifying, using a nearest neighbor search, the respective segments of the input acoustic time series based on the intermediate audio features to generate a final intermediate feature as a classification for the input acoustic time series, each of the respective segments corresponding to a respective different one of different acoustic windows;
wherein said generating step comprises:
learning the intermediate audio features from Multi-Frequency Cepstral Component (MFCC) features extracted from the input acoustic time series;
dividing the same scene into the different acoustic windows having varying ones of the MFCC features; and
feeding the MFCC features of each of the different acoustic windows into respective Long Short-Term Memory (LSTM) units such that a hidden state of each of the respective LSTM units is passed through an attention layer to identify feature correlations between hidden states at different time steps corresponding to different ones of the different acoustic windows, and
wherein the method further includes replacing a hardware device monitored by the sensor responsive to the final intermediate feature.

17. The computer program product of claim 16, wherein the intermediate acoustic features both capture feature correlations between different acoustic windows in a same scene and isolate and weaken an effect of uninteresting features in the same scene.

18. The computer program product of claim 16, wherein said classifying step comprises generating the final intermediate feature for each of the different acoustic windows by optimizing a triplet loss function to which is added a regularization parameter computed on each of the intermediate audio features to reduce an importance of the uninteresting features, and wherein the uninteresting features comprise silence.

19. The computer program product of claim 18, wherein the triplet loss function adjusts a triplet selection algorithm to avoid using segments the uninteresting portions as silence and noise by using a silence and noise bias.

20. A computer processing system for audio scene classification in an information retrieval system, comprising:
   a memory device for storing program code; and
   a hardware processor, operatively coupled to the memory device, for running the program code to
      generate intermediate audio features from respective segments of an input acoustic time series for a same scene captured by a sensor device; and
      classify, using a nearest neighbor search, the respective segments of the input acoustic time series based on the intermediate audio features to generate a final intermediate feature as a classification for the input acoustic time series, each of the respective segments corresponding to a respective different one of different acoustic windows;
   wherein the hardware processor runs the program code to generate the intermediate audio features to
      learn the intermediate audio features from Multi-Frequency Cepstral Component (MFCC) features extracted from the input acoustic time series;
      divide the same scene into the different acoustic windows having varying ones of the MFCC features; and
      feed the MFCC features of each of the different acoustic windows into respective Long Short-Term Memory (LSTM) units such that a hidden state of each of the respective LSTM units is passed through an attention layer to identify feature correlations between hidden states at different time steps corresponding to different ones of the different acoustic windows, and
   wherein the hardware processor replaces a hardware device monitored by the sensor responsive to the final intermediate feature.

\* \* \* \* \*